March 10, 1931.  L. ZOLLA  1,795,589

SECTION CONNECTING MEANS

Filed Jan. 28, 1929

Inventor
Leon Zolla
By Liverance and
Van Antwerp
Attorneys

Patented Mar. 10, 1931

1,795,589

UNITED STATES PATENT OFFICE

LEON ZOLLA, OF LONG ISLAND CITY, NEW YORK, ASSIGNOR TO GRAND RAPIDS STORE EQUIPMENT CORPORATION, OF GRAND RAPIDS, MICHIGAN, A CORPORATION OF MICHIGAN

SECTION-CONNECTING MEANS

Application filed January 28, 1929. Serial No. 335,538.

This invention relates to a section connecting means which may be used in a great many relations, particularly for connecting base or cornice sections in the construction of counters, top sections in the construction of tables, and the like; which also may be used in connecting the base or top or cornice sections of sectional bookcases, or used in connecting various panels of partitions used in building constructions and the like. The invention is not to be limited to any particular method of use, though one way of using the same only is illustrated and described.

It is a primary object and purpose of the present invention to provide a very simple connecting means between the ends of sections, lengths of material, cornice or base constructions and the like, which is very quickly and easily applied and which will serve to snugly and securely tie the sections together and, at the same time, provide a projecting tongue between the ends of the different members which are connected by the connecting means having any desired configuration or design to correspond to the outer design of the members which are connected together thereby.

It is a further object and purpose of the invention to provide a connecting device which is of simple and economical character, readily manufactured at low cost, and very durable and efficient for the purposes for which it is designed.

An understanding of the invention, for the attainment of the ends stated, as well as many others not at this time specifically enumerated, may be had from the following description taken in connection with the accompanying drawing, in which, Fig. 1 is a fragmentary perspective view illustrating the connecting means of my invention utilized to join two sections in end to end relation.

Like reference characters refer to like parts in the different figures of the drawing.

Figure 1:
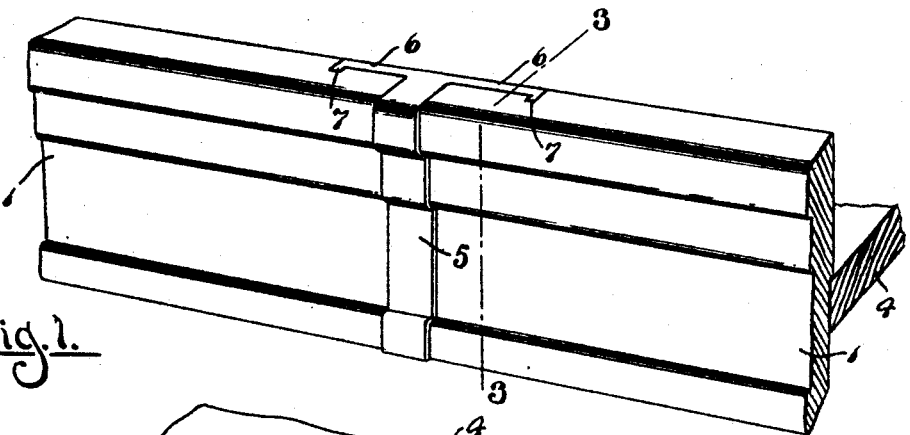

In the construction illustrated, two base or cornice members 1 are disposed in longitudinal alinement with their ends spaced a distance apart. Each of said members 1 at its inner side and adjacent the end thereof spaced from the end of the contiguous section 1 has a portion rabbeted or cut away, as indicated at 2, and there is also provided a vertical groove 3 at the end of said cut away portion. Horizontal members 4 are permanently secured to and extend from the members 1 adapted to have their contiguous ends abutting in close engagement with each other. Such type of construction may be utilized to very good advantage in providing a counter or table top with an upwardly extending enclosing border member around it at its side and end edges and the top may be made of a plurality of sections which may be joined together by the connecting means about to be described.

The connecting means includes a member of metal having an outwardly extending tongue 5, the thickness of which is equal to the distance that the ends of the members 1 are spaced apart, while its outer surface is made in exact conformity to the design of the outer surfaces of said members 1. From the inner end or side of the tongue 5 integral wings 6 extend at right angles from which at their free edges tongues 7 extend outwardly, whereby the spaces provided by cutting away the parts at 2 and the grooves at 3 may be filled with the wings 6 and tongues 7, thereby bringing the ends of the members 1 into snug and tight engagement with the sides of the tongue 5. Holes 8 are made through the wings 6 for the passage of screws 9 which screw into the members 1 thereby permanently securing the parts together and securing the adjacent ends of the horizontal members 4 into tight abutting engagement with each other.

The application of the connecting member described to the construction is as follows: The two parts which are to be connected together are placed in alinement with the ends of the horizontal members 4 in abutting engagement. The connecting member of metal described is then inserted with the tongue 5 between the ends of the members 1, the wings 6 entering into the spaces at 2 and the tongues 7 into the grooves at 3. The connecting member is then forced or driven in a downward direction until its upper end is flush with the upper edges of the member 1. The screws 9 are then inserted and the assembly is complete.

This construction is very useful in the manufacture of relatively long counters, both for the bases of the counter and the tops therefor. The bases and tops may be made up of sections connected by a plurality of connecting devices, as described, and the panels between the bases and top may be made in similar lengths and properly secured in place in any desired manner. The connecting members when in place and secured operate to make the connected sectional structure very strong and rigid, while the appearance is not only not detracted from but is enhanced.

Figure 2:
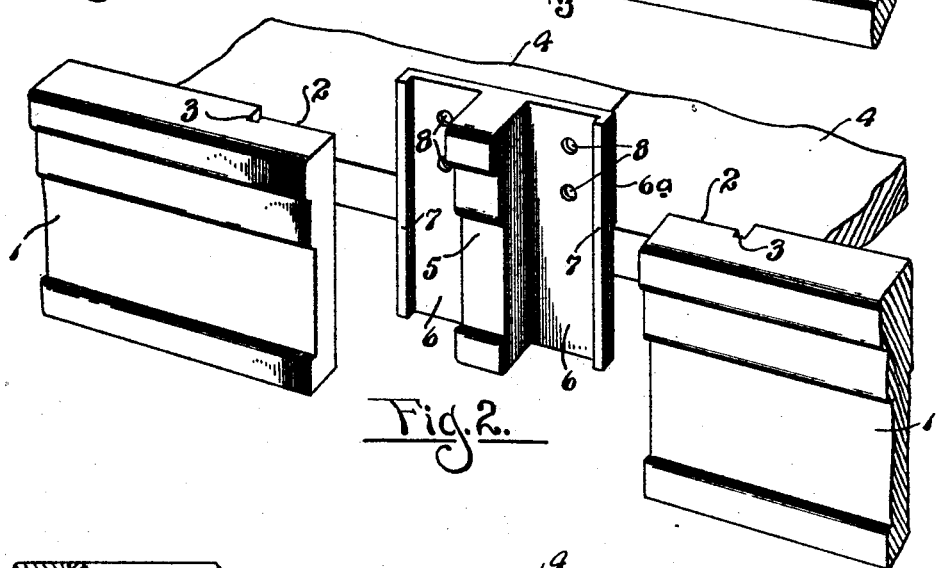
Fig. 2 is a fragmentary perspective view showing the various parts of the construction in Fig. 1 separated from each other.
Figure 3:
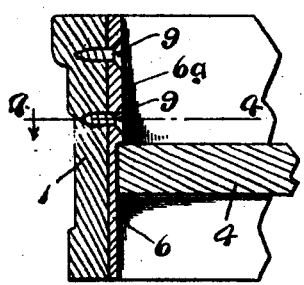
Fig. 3 is a vertical section substantially on the plane of line 3—3 of Fig. 1.
Figure 4:
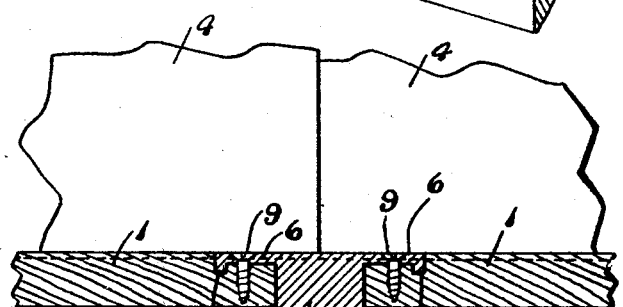
Fig. 4 is a fragmentary horizontal section substantially on the plane of line 4—4 of Fig. 3.

As shown in Figs. 2 and 3 the upper portions of the wings 6 may be thickened, as indicated at 6a, the shoulder between the upper and lower portions thereof coming against the upper sides of the horizontal members 4 when the connecting device is in place.

This device, as before stated may be used in a great many places, not only with counter or table top sections, as illustrated in the drawing, but it may be also used with sectional furniture of the sectional bookcase type for joining the ends of the bases and the tops of cornices. The invention is defined in the appended claims and is to be considered comprehensive of all forms of structure coming within the scope thereof.

I claim:

1. A sectional construction comprising, a plurality of sections located end to end, including horizontal members having abutting end engagement, and outer vertical members attached to the horizontal members spaced from each other at their adjacent ends, a plate secured to and located back of the inner sides of the end portions of the outer members of the sections and abutting against a juncture of the horizontal members and bridging the space between the said vertical members and an integral tongue on said plate formed at its front face to conform to the outer surfaces of said vertical members extending into and filling the space between the spaced apart ends of adjacent outer members of the sections.

2. A sectional construction comprising two sections located end to end, one of said sections including a horizontal member, an outer vertical member attached to said horizontal member, another vertical member spaced from the aforesaid vertical member and in alinement therewith, a plate secured to and located back of the inner sides of the spaced ends of the vertical members, and bridging the space therebetween, and an integral tongue on said plate formed at its front face to conform to the outer surfaces of said vertical members extending into and filling the space between the aforesaid spaced ends of the vertical members, said plate being adapted to contact at its rear face with the horizontal member.

3. A connecting device of the class described comprising, a vertical tongue of metal, integral wings extending in opposite directions from the inner side of said tongue, and narrow tongues of less depth than the first mentioned tongue extending at right angles from the free edges of said wings in the same direction as the first tongue, and a shoulder extending across the wings, said shoulder being located on the opposite side of the wings from the tongues and transversely to the tongues.

In testimony whereof I affix my signature.

LEON ZOLLA.